(12) United States Patent
Ellison et al.

(10) Patent No.: US 6,996,710 B1
(45) Date of Patent: Feb. 7, 2006

(54) PLATFORM AND METHOD FOR ISSUING AND CERTIFYING A HARDWARE-PROTECTED ATTESTATION KEY

(75) Inventors: Carl M. Ellison, Portland, OR (US); Roger A. Golliver, Beaverton, OR (US); Howard C. Herbert, Phoenix, AZ (US); Derrick C. Lin, Foster City, CA (US); Francis X. McKeen, Portland, OR (US); Gilbert Neiger, Portland, OR (US); Ken Reneris, Wilbraham, MA (US); James A. Sutton, Portland, OR (US); Shreekant S. Thakkar, Portland, OR (US); Millind Mittal, Palo Alto, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/538,951

(22) Filed: Mar. 31, 2000

(51) Int. Cl.
*H04L 9/00* (2006.01)

(52) U.S. Cl. .................... 713/156; 713/164; 713/165; 713/167

(58) Field of Classification Search ............... 713/156, 713/155, 168, 188, 189, 164, 165, 167; 705/55
See application file for complete search history.

(56) References Cited

U.S. PATENT DOCUMENTS

| | | | |
|---|---|---|---|
| 3,699,532 A | 10/1972 | Schaffer et al. | |
| 3,996,449 A | 12/1976 | Attanasio et al. | |
| 4,037,214 A | 7/1977 | Birney et al. | |
| 4,162,536 A | 7/1979 | Morley | |
| 4,207,609 A | 6/1980 | Luiz et al. | |
| 4,247,905 A | 1/1981 | Yoshida et al. | |
| 4,276,594 A | 6/1981 | Morley | |
| 4,278,837 A | 7/1981 | Best | |
| 4,307,447 A | 12/1981 | Provanzano et al. | |
| 4,319,233 A | 3/1982 | Matsuoka et al. | |
| 4,319,323 A | 3/1982 | Ermolovich et al. | |
| 4,347,565 A | 8/1982 | Kaneda et al. | |
| 4,366,537 A | 12/1982 | Heller et al. | |
| 4,403,283 A * | 9/1983 | Myntti et al. .................... 711/2 |
| 4,419,724 A | 12/1983 | Branigin et al. | |
| 4,430,709 A | 2/1984 | Schleupen | |
| 4,521,852 A | 6/1985 | Guttag | |
| 4,759,064 A | 7/1988 | Chaum | |
| 4,802,084 A | 1/1989 | Ikegaya et al. | |
| 4,975,836 A | 12/1990 | Hirosawa et al. | |
| 5,007,082 A | 4/1991 | Cummins | |
| 5,022,077 A | 6/1991 | Bealkowski et al. | |
| 5,075,842 A | 12/1991 | Lai | |

(Continued)

FOREIGN PATENT DOCUMENTS

DE 4217444 12/1992

(Continued)

OTHER PUBLICATIONS

Brands, Stefan, "Restrictive Blinding of Secret-Key Certificates", *Springer-Verlag XP002201306*, (1995), Chapter 3.

(Continued)

*Primary Examiner*—Gilberto Barron, Jr.
*Assistant Examiner*—Cas Stulberger
(74) *Attorney, Agent, or Firm*—Michael R. Barre (57) ABSTRACT

In one embodiment, a method for certifying an attestation key comprises generating a remote attestation key pair within a platform and producing a certificate. The certificate includes a public attestation key to attest that a private attestation key, corresponding to the public attestation key, is stored in hardware-protected memory.

19 Claims, 6 Drawing Sheets

U.S. PATENT DOCUMENTS

| | | |
|---|---|---|
| 5,079,737 A | 1/1992 | Hackbarth |
| 5,187,802 A | 2/1993 | Inoue et al. |
| 5,230,069 A | 7/1993 | Brelsford et al. |
| 5,237,616 A | 8/1993 | Abraham et al. |
| 5,255,379 A | 10/1993 | Melo |
| 5,287,363 A | 2/1994 | Wolf et al. |
| 5,293,424 A | 3/1994 | Holtey et al. |
| 5,295,251 A | 3/1994 | Wakui et al. |
| 5,303,378 A | 4/1994 | Cohen |
| 5,317,705 A | 5/1994 | Gannon et al. |
| 5,319,760 A | 6/1994 | Mason et al. |
| 5,361,375 A | 11/1994 | Ogi |
| 5,386,552 A | 1/1995 | Garney |
| 5,421,006 A | 5/1995 | Jablon et al. |
| 5,437,033 A | 7/1995 | Inoue et al. |
| 5,459,867 A | 10/1995 | Adams et al. |
| 5,459,869 A | 10/1995 | Spilo |
| 5,469,557 A | 11/1995 | Salt et al. |
| 5,473,692 A | 12/1995 | Davis |
| 5,479,509 A | 12/1995 | Ugon |
| 5,504,922 A | 4/1996 | Seki et al. |
| 5,506,975 A | 4/1996 | Onodera |
| 5,511,217 A | 4/1996 | Nakajima et al. |
| 5,522,075 A | 5/1996 | Robinson et al. |
| 5,555,385 A | 9/1996 | Osisek |
| 5,555,414 A | 9/1996 | Hough et al. |
| 5,560,013 A | 9/1996 | Scalzi et al. |
| 5,564,040 A | 10/1996 | Kubala |
| 5,568,552 A | 10/1996 | Davis |
| 5,574,936 A | 11/1996 | Ryba et al. |
| 5,582,717 A | 12/1996 | Di Santo |
| 5,604,805 A | 2/1997 | Brands |
| 5,606,617 A | 2/1997 | Brands |
| 5,615,263 A | 3/1997 | Takahashi |
| 5,628,022 A | 5/1997 | Ueno et al. |
| 5,633,929 A | 5/1997 | Kaliski, Jr. |
| 5,657,445 A | 8/1997 | Pearce |
| 5,668,971 A | 9/1997 | Neufeld |
| 5,684,948 A | 11/1997 | Johnson et al. |
| 5,706,469 A | 1/1998 | Kobayashi |
| 5,717,903 A | 2/1998 | Bonola |
| 5,729,760 A | 3/1998 | Poisner |
| 5,737,604 A | 4/1998 | Miller et al. |
| 5,737,760 A | 4/1998 | Grimmer, Jr. et al. |
| 5,740,178 A | 4/1998 | Jacks et al. |
| 5,752,046 A | 5/1998 | Oprescu et al. |
| 5,757,919 A | 5/1998 | Herbert et al. |
| 5,764,969 A | 6/1998 | Kahle et al. |
| 5,796,845 A | 8/1998 | Serikawa et al. |
| 5,805,712 A | 9/1998 | Davis |
| 5,809,546 A | 9/1998 | Greenstein et al. |
| 5,825,880 A * | 10/1998 | Sudia et al. ............... 713/180 |
| 5,835,594 A | 11/1998 | Albrecht et al. |
| 5,844,986 A | 12/1998 | Davis |
| 5,852,717 A | 12/1998 | Bhide et al. |
| 5,854,913 A | 12/1998 | Goetz et al. |
| 5,872,994 A | 2/1999 | Akiyama et al. |
| 5,890,189 A | 3/1999 | Nozue et al. |
| 5,898,883 A | 4/1999 | Fujii et al. |
| 5,901,225 A | 5/1999 | Ireton et al. |
| 5,919,257 A | 7/1999 | Trostle |
| 5,935,242 A | 8/1999 | Madany et al. |
| 5,935,247 A | 8/1999 | Pai et al. |
| 5,937,063 A | 8/1999 | Davis |
| 5,950,221 A | 9/1999 | Draves et al. |
| 5,956,408 A | 9/1999 | Arnold |
| 5,970,147 A | 10/1999 | Davis |
| 5,978,475 A | 11/1999 | Schneier et al. |
| 5,978,481 A | 11/1999 | Ganesan et al. |
| 5,987,557 A | 11/1999 | Ebrahim |
| 6,014,745 A | 1/2000 | Ashe |
| 6,035,374 A | 3/2000 | Panwar et al. |
| 6,044,478 A | 3/2000 | Green |
| 6,055,637 A | 4/2000 | Hudson et al. |
| 6,058,478 A | 5/2000 | Davis |
| 6,061,794 A | 5/2000 | Angelo |
| 6,075,938 A | 6/2000 | Bugnion et al. |
| 6,085,296 A | 7/2000 | Karkhanis et al. |
| 6,088,262 A | 7/2000 | Nasu |
| 6,092,095 A | 7/2000 | Maytal |
| 6,093,213 A | 7/2000 | Favor et al. |
| 6,108,644 A * | 8/2000 | Goldschlag et al. ........... 705/69 |
| 6,115,816 A | 9/2000 | Davis |
| 6,125,430 A | 9/2000 | Noel et al. |
| 6,131,166 A | 10/2000 | Wong-Insley |
| 6,148,379 A | 11/2000 | Schimmel |
| 6,158,546 A | 12/2000 | Hanson et al. |
| 6,173,417 B1 | 1/2001 | Merrill |
| 6,175,924 B1 | 1/2001 | Arnold |
| 6,175,925 B1 | 1/2001 | Nardone et al. |
| 6,178,509 B1 | 1/2001 | Nardone et al. |
| 6,182,089 B1 | 1/2001 | Ganapathy et al. |
| 6,188,257 B1 | 2/2001 | Buer |
| 6,192,455 B1 | 2/2001 | Bogin et al. |
| 6,199,152 B1 | 3/2001 | Kelly et al. |
| 6,205,550 B1 | 3/2001 | Nardone et al. |
| 6,212,635 B1 | 4/2001 | Reardon |
| 6,222,923 B1 | 4/2001 | Schwenk |
| 6,226,749 B1 | 5/2001 | Carloganu et al. |
| 6,249,872 B1 | 6/2001 | Wildgrube et al. |
| 6,252,650 B1 | 6/2001 | Nakamura |
| 6,269,392 B1 | 7/2001 | Cotichini et al. |
| 6,272,533 B1 | 8/2001 | Browne |
| 6,272,637 B1 | 8/2001 | Little et al. |
| 6,275,933 B1 | 8/2001 | Fine et al. |
| 6,282,650 B1 | 8/2001 | Davis |
| 6,282,651 B1 | 8/2001 | Ashe |
| 6,282,657 B1 | 8/2001 | Kaplan et al. |
| 6,292,874 B1 | 9/2001 | Barnett |
| 6,301,646 B1 | 10/2001 | Hostetter |
| 6,314,409 B2 | 11/2001 | Schneck et al. |
| 6,321,314 B1 | 11/2001 | Van Dyke |
| 6,327,652 B1 | 12/2001 | England et al. |
| 6,330,670 B1 | 12/2001 | England et al. |
| 6,339,815 B1 | 1/2002 | Feng et al. |
| 6,339,816 B1 | 1/2002 | Bausch |
| 6,357,004 B1 | 3/2002 | Davis |
| 6,363,485 B1 | 3/2002 | Adams et al. |
| 6,374,286 B1 | 4/2002 | Gee et al. |
| 6,374,317 B1 | 4/2002 | Ajanovic et al. |
| 6,378,068 B1 | 4/2002 | Foster et al. |
| 6,378,072 B1 | 4/2002 | Collins et al. |
| 6,389,537 B1 | 5/2002 | Davis et al. |
| 6,397,242 B1 | 5/2002 | Devine et al. |
| 6,397,379 B1 | 5/2002 | Yates, Jr. et al. |
| 6,412,035 B1 | 6/2002 | Webber |
| 6,421,702 B1 | 7/2002 | Gulick |
| 6,445,797 B1 | 9/2002 | McGough |
| 6,463,535 B1 | 10/2002 | Drews |
| 6,463,537 B1 | 10/2002 | Tello |
| 6,499,123 B1 | 12/2002 | McFarland et al. |
| 6,505,279 B1 | 1/2003 | Phillips et al. |
| 6,507,904 B1 | 1/2003 | Ellison et al. |
| 6,529,909 B1 | 3/2003 | Bowman-Amuah |
| 6,535,988 B1 | 3/2003 | Poisner |
| 6,557,104 B2 | 4/2003 | Vu et al. |
| 6,560,627 B1 | 5/2003 | McDonald et al. |
| 6,609,199 B1 * | 8/2003 | DeTreville ................. 713/172 |
| 6,615,278 B1 | 9/2003 | Curtis |
| 6,633,963 B1 | 10/2003 | Ellison et al. |
| 6,633,981 B1 | 10/2003 | Davis |
| 6,651,171 B1 | 11/2003 | England et al. |
| 6,684,326 B1 | 1/2004 | Cromer et al. |
| 6,701,284 B1 | 3/2004 | Huntley et al. |

| | | | |
|---|---|---|---|
| 2001/0021969 | A1 | 9/2001 | Burger et al. |
| 2001/0027527 | A1 | 10/2001 | Khidekel et al. |
| 2001/0037450 | A1 | 11/2001 | Metlitski et al. |

FOREIGN PATENT DOCUMENTS

| | | |
|---|---|---|
| EP | 0473913 | 3/1992 |
| EP | 0600112 | 8/1994 |
| EP | 0892521 | 1/1999 |
| EP | 0930567 A | 7/1999 |
| EP | 0961193 | 12/1999 |
| EP | 0965902 | 12/1999 |
| EP | 1055989 | 11/2000 |
| EP | 1056014 | 11/2000 |
| EP | 1085396 | 3/2001 |
| EP | 1146715 | 10/2001 |
| JP | 11161521 A | 6/1999 |
| JP | 02000076139 A | 3/2000 |
| WO | WO9524696 | 9/1995 |
| WO | WO 97/29567 | 8/1997 |
| WO | WO9812620 | 3/1998 |
| WO | WO9834365 A | 8/1998 |
| WO | WO9844402 | 10/1998 |
| WO | WO9905600 | 2/1999 |
| WO | WO9909482 | 2/1999 |
| WO | WO9918511 | 4/1999 |
| WO | WO99/38076 | 7/1999 |
| WO | WO9957863 | 11/1999 |
| WO | WO99/65579 | 12/1999 |
| WO | WO0021238 | 4/2000 |
| WO | WO0062232 | 10/2000 |
| WO | WO 01/27723 A | 4/2001 |
| WO | WO 01/27821 A | 4/2001 |
| WO | WO0163994 | 8/2001 |
| WO | WO 01 75564 A | 10/2001 |
| WO | WO 01/75565 | 10/2001 |
| WO | WO 01/75595 | 10/2001 |
| WO | WO0201794 | 1/2002 |
| WO | WO 02 17555 A | 2/2002 |
| WO | WO02060121 | 8/2002 |
| WO | WO 02 086684 A | 10/2002 |
| WO | WO03058412 | 7/2003 |

OTHER PUBLICATIONS

Davida, George I., et al., "Defending Systems Against Viruses through Cryptographic Authentication", *Proceedings of the Symposium on Security and Privacy*, IEEE Comp. Soc. Press, ISBN 0-8186-1939-2,(May 1989).

Kashiwagi, Kazuhiko , et al., "Design and Implementation of Dynamically Reconstructing System Software", *Software Engineering Conference*, Proceedings 1996 Asia-Pacific Seoul, South Korea Dec. 4-7, 1996, Los Alamitos, CA USA, IEEE Comput. Soc, US, ISBN 0-8186-7638-8,(1996).

Luke, Jahn , et al., "Replacement Strategy for Aging Avionics Computers", *IEEE AES Systems Magazine*, XP002190614,(Mar. 1999).

Menezes, Oorschot , "Handbook of Applied Cryptography", *CRC Press LLC, USA XP002201307*, (1997),475.

Richt, Stefan , et al., "In-Circuit-Emulator Wird Echtzeittauglich", *Elektronic, Franzis Verlag GMBH, Munchen, DE*, vol. 40, No. 16, XP000259620,(100-103),Aug. 6, 1991.

Saez, Sergio , et al., "A Hardware Scheduler for Complex Real-Time Systems", *Proceedings of the IEEE International Symposium on Industrial Electronics*, XP002190615,(Jul. 1999),43-48.

Sherwood, Timothy , et al., "Patchable Instruction ROM Architecture", *Department of Computer Science and Engineering, University of California, San Diego, La Jolla, CA*, (Nov. 2001).

"Information Display Technique for a Terminate Stay Resident Program," IBM Technical Disclosure Bulletin, TDB-ACC-No. NA9112156, Dec. 1, 1991, pp. 156-158, vol. 34, Issue No. 7A.

Karger, Paul A., et al., "A VMM Security Kernel for the VAX Architecture," Proceedings of the Symposium on Research in Security and Privacy, May 7, 1990, pp. 2-19, XP010020182, ISBN: 0-8186-2060-9, Boxborough, MA.

Chien, Andrew A., et al., "Safe and Protected Execution for the Morph/AMRM Reconfigurable Processor," 7th Annual IEEE Symposium, FCCM '99 Proceedings Apr. 21, 1999, pp. 209-221, XP010359180, ISBN: 0-7695-0375-6, Los Alamitos, CA.

Goldberg, R., "Survey of virtual machine research," IEEE Computer Magazine 7(6), pp. 34-45, 1974.

Gum, P.H., "System/370 Extended Architecture: Facilities for Virtual Machines," IBM J. Research Development, vol. 27, No. 6, pp. 530-544, Nov. 1983.

Rosenblum, M. "Vmware's Virtual Platform: A Virtual Machine Monitor for Commodity PCs," Proceedings of the 11th Hotchips Conference, pp. 185-196, Aug. 1999.

Lawton, K., "Running Multiple Operating Systems Concurrently on an IA32 PC Using Virtualization Techniques," http://www.plex86.org/research/paper.txt; Nov. 29, 1999; pp. 1-31.

"M68040 User's Manual", 1993, Motorola Inc., p. 1-5-p. 1-9, p. 1-13-p. 1-20, p. 2-1-p. 2-3, p. 4-1, p. 8-9-p. 8-11.

"Intel 386 Dx Microprocessor 32-Bit Chmos Microprocessor With Integrated Memory Management", Dec. 31, 1995, Intel Inc., p. 32-56; figure 4-14.

Joe Heinrich: MIPS R4000 Microprocessor User's Manual, 1994, MIPS Technology Inc., Mountain View, CA, pp. 67-79.

Berg C: "How Do I Create a Signed Applet?", Dr. Dobb's Journal, M&T Publ., Redwood City, CA, US, vol. 22, No. 8, 8 '97, p. 109-111, 122.

Gong L et al: "Going Beyond the Sandbox: An Overview of the New Security Architecture in the Java Development Kit 1.2", Proceedings of the Usenix Symposium on Internet Technologies and Systems, Montery, CA 12 '97, pp. 103-112.

J. Heinrich: "MIPS R4000 Microprocessor User's Manual," Apr. 1, 1993, MIPS, Mt. View, XP002184449, pp. 61-97.

Coulouris, George , et al., "Distributed Systems, Concepts and Designs", *2nd Edition*, (1994),422-424.

Crawford, John, "Architecture of the Intel 80386", *Proceedings of the IEEE International Conference on Computer Design: VLSI in Computers and Processors (ICCD '86)*, (Oct. 6, 1986),155-160.

Fabry, R.S., "Capability-Based Addressing", *Fabry, R.S., "Capability-Based Addressing," Communications of the ACM, vol. 17, No. 7*, (Jul. 1974),403-412.

Frieder, Gideon, "The Architecture And Operational Characteristics of the VMX Host Machine", *The Architecture And Operational Characteristics of the VMX Host Machine, IEEE*, (1982),9-16.

Intel Corporation, "IA-64 System Abstraction Layer Specification", *Intel Product Specification, Order No. 245359-001*, (Jan. 2000),1-112.

Intel Corporation, "Intel IA-64 Architecture Software Developer's Manual", *vol. 2; IA-64 System Architecture, Order No. 245318-001*, (Jan. 2000),i, ii, 5.1-5.3, 11.1-11.8, 11.23-11.26.

Menezes, Alfred J., et al., "Handbook of Applied Cryptography", *CRC Press Series on Discrete Mathematics*

*and its Applications*, Boca Raton, FL, XP002165287, ISBN 0849385237,(Oct. 1996),403-405, 506-515, 570.

Nanba, S. , et al., "VM/4: ACOS-4 Virtual Machine Architecture", *VM/4; ACOS-4 Virtual Machine Architecture, IEEE*, (1985),171-178.

RSA Security, "Hardware Authenticators", www.rsasecurity.com/node.asp?id=1158, 1-2.

RSA Security, "RSA SecurID Authenticators", www.rsasecurity.com/products/securid/datasheets/SID_DS_0103.pdf, 1-2.

RSA Security, "Software Authenticators", www.srasecurity.com/node.asp?id=1313, 1-2.

Schneier, Bruce, "Applied Cryptography: Protocols, Algorithm, and Source Code in C", *Wiley, John & Sons, Inc.*, XP002138607; ISBN 0471117099,(OCt. 1995),56-65.

Schneier, Bruce, "Applied Cryptography: Protocols, Algorithms, and Source Code C", *Wiley, John & Sons, Inc.*, XP0021111449; ISBN 0471117099,(Oct. 1995), 169-187.

Schneier, Bruce, "Applied Cryptography: Protocols, Algorithms, and Source Code in C", *2nd Edition: Wiley, John & Sons, Inc.*, XP002251738; ISBN 0471128457,(Nov. 1995),28-33; 176-177; 216-217; 461-473;518-522.

U.S. Appl. No. 09/672,603, Controlling Accesses To Isolated Memory Using A Memory Controller For Isolated Execution.

U.S. Appl. No. 09/822,986, Checking File Integrity Using Signature Generated In Isolated Execution.

U.S. Appl. No. 09/538,951, Platform And Method For Issuing And Certifying A Hardware-Protected Attestation Key.

U.S. Appl. No. 09/539,344, Managing A Secure Platform Using A Hierarchical Executive Architecture In Isolated Execution Mode.

U.S. Appl. No. 09/668,585, Managing A Secure Platform Using A Hierarchical Executive Architecture In Isolated Execution Mode.

U.S. Appl. No. 09/541,108, Platform And Method For Remote Attestation Of A Platform.

U.S. Appl. No. 09/540,612, Platform And Method For Generating And Utilizing A Protected Audit Log.

U.S. Appl. No. 09/540,946, Protecting Software Environment In Isolated Execution.

U.S. Appl. No. 09/668,610, Protecting Software Environment In Isolated Execution.

U.S. Appl. No. 09/538,954 Generating Isolated Bus Cycles For Isolated Execution.

U.S. Appl. No. 09/539,348, Generating A Key Hierarchy For Use In An Isolated Execution Environment.

U.S. Appl. No. 09/541,477, Isolated Instructions For Isolated Execution.

U.S. Appl. No. 09/540,611, Managing Accesses In A Processor For Isolated Execution.

U.S. Appl. No. 09/540,613, Managing A Secure Environment Using A Chipset In Isolated Execution Mode.

U.S. Appl. No. 09/668,408, Managing A Secure Environment Using A Chipset In Isolated Execution Mode.

U.S. Appl. No. 09/541,667, Attestation Key Memory Device And Bus.

U.S. Appl. No. 09/672,602, Attestation Key Memory Device And Bus.

U.S. Appl. No. 09/618,738, Controlling Access To Multiple Isolated Memories In An Isolated Execution Environment.

U.S. Appl. No. 09/618,489, Controlling Access To Multiple Memory Zones In An Isolated Execution Environment.

U.S. Appl. No. 10/683,542, Controlling Access To Multiple Memory Zones In An Isolated Execution Environment.

U.S. Appl. No. 09/618,659, Resetting A Processor In An Isolated Execution Environment.

U.S. Appl. No. 09/751,586, Resetting A Processor In An Isolated Execution Environment.

\* cited by examiner

PLATFORM AND METHOD FOR ISSUING AND CERTIFYING A HARDWARE-PROTECTED ATTESTATION KEY

BACKGROUND

1. Field

This invention relates to the field of data security. In particular, the invention relates to a platform and method for certifying a key within protected hardware.

2. Background

Advances in technology have opened up many opportunities for applications that go beyond the traditional ways of doing business. Electronic commerce (e-commerce) and business-to-business (B2B) transactions are now becoming popular, reaching the global markets at a fast rate. Unfortunately, while electronic platforms like computers provide users with convenient and efficient methods of doing business, communicating and transacting, they are also vulnerable for unscrupulous attacks. Examples of these attacks include virus, intrusion, security breach, and tampering, to name a few. Therefore, it is becoming more and more important to protect the integrity of data stored within or downloaded into a platform.

Various data security mechanisms may be used to protect the integrity of data exchanged between electronic platforms. One type of data security mechanism involves the development of cryptographic hardware having a private key stored in a secure manner. This hardware produces a digital signature by digitally signing data with the pre-stored private key in accordance with a selected digital signature function (e.g., Digital Signature Algorithm "DSA"). Accompanying the data during transmission, the digital signature protects the integrity of the data.

In order to recover the data, an authentication certificate normally accompanies the digital signature. The authentication certificate provides a public key corresponding to the private key for use in data recovery and for certifying (or attesting) to something. The meaning of a certificate depends on the contents of the certificate and the empowerment of the certificate signer (issuer).

BRIEF DESCRIPTION OF THE DRAWINGS

The features and advantages of the present invention will become apparent from the following detailed description of one or more example embodiments of the present invention in which.

DETAILED DESCRIPTION

The present invention relates to a platform and method for certifying a key within protected hardware. Herein, certain details are set forth in order to provide a thorough understanding of the present invention. It is apparent to a person of ordinary skill in the art, however, that the present invention may be practiced through many embodiments other than those illustrated. Well-known circuits and hashing techniques are not set forth in detail in order to avoid unnecessarily obscuring the present invention.

In the following description, terminology is used to discuss certain features of the present invention. For example, a "platform" includes hardware equipment and/or software that perform different functions on stored information. Examples of a platform include, but are not limited or restricted to a computer (e.g., desktop, a laptop, a hand-held, a server, a workstation, etc.), desktop office equipment (e.g., printer, scanner, a facsimile machine, etc.), a wireless telephone handset, a television set-top box, and the like. A "software module" includes code that, when executed, performs a certain function. A "nub" is a series of code instructions, possibly a subset of code from a software module. A "link" is broadly defined as one or more information-carrying mediums (e.g., electrical wire, optical fiber, cable, bus, or wireless signaling technology).

In addition, the term "information" is defined as one or more bits of data, address, and/or control. A "segment" is one or more bytes of information. A "page" is a predetermined number of bytes, usually a power of two in length (e.g., 512, 1024, etc.). A "one-way hash function" is a function, mathematical or otherwise, that converts information from a variable-length to a fixed-length (referred to as a "hash value" or "digest"). The term "one-way" indicates that there does not readily exist an inverse function to recover any discernible portion of the original information from the fixed-length hash value. Examples of a hash function include MD5 provided by RSA Data Security of Redwood City, Calif., or Secure Hash Algorithm (SHA-1) as specified a 1995 publication Secure Hash Standard FIPS 180-1 entitled "Federal Information Processing Standards Publication" (Apr. 17, 1995).

I. Architecture Overview

A. Isolated Execution Platform

One principle for enhancing security is through configuration of the platform with an isolated execution (ISOX™) architecture. The ISOX™ architecture includes logical and physical definitions of hardware and software components that interact directly or indirectly with an operating system of a platform. Herein, the operating system and a processor of the platform may have several levels of hierarchy, referred to as rings, which correspond to various operational modes. A "ring" is a logical division of hardware and software components that are designed to perform dedicated tasks within the operating system. The division is typically based on the degree or level of privilege, namely the ability to make changes to the platform. For example, a ring-0 is the innermost ring, being at the highest level of the hierarchy. Ring-0 encompasses the most critical, privileged components. Ring-3 is the outermost ring, being at the lowest level of the hierarchy. Ring-3 typically encompasses user level applications, which are normally given the lowest level of privilege. Ring-1 and ring-2 represent the intermediate rings with decreasing levels of privilege.

Figure 1A:
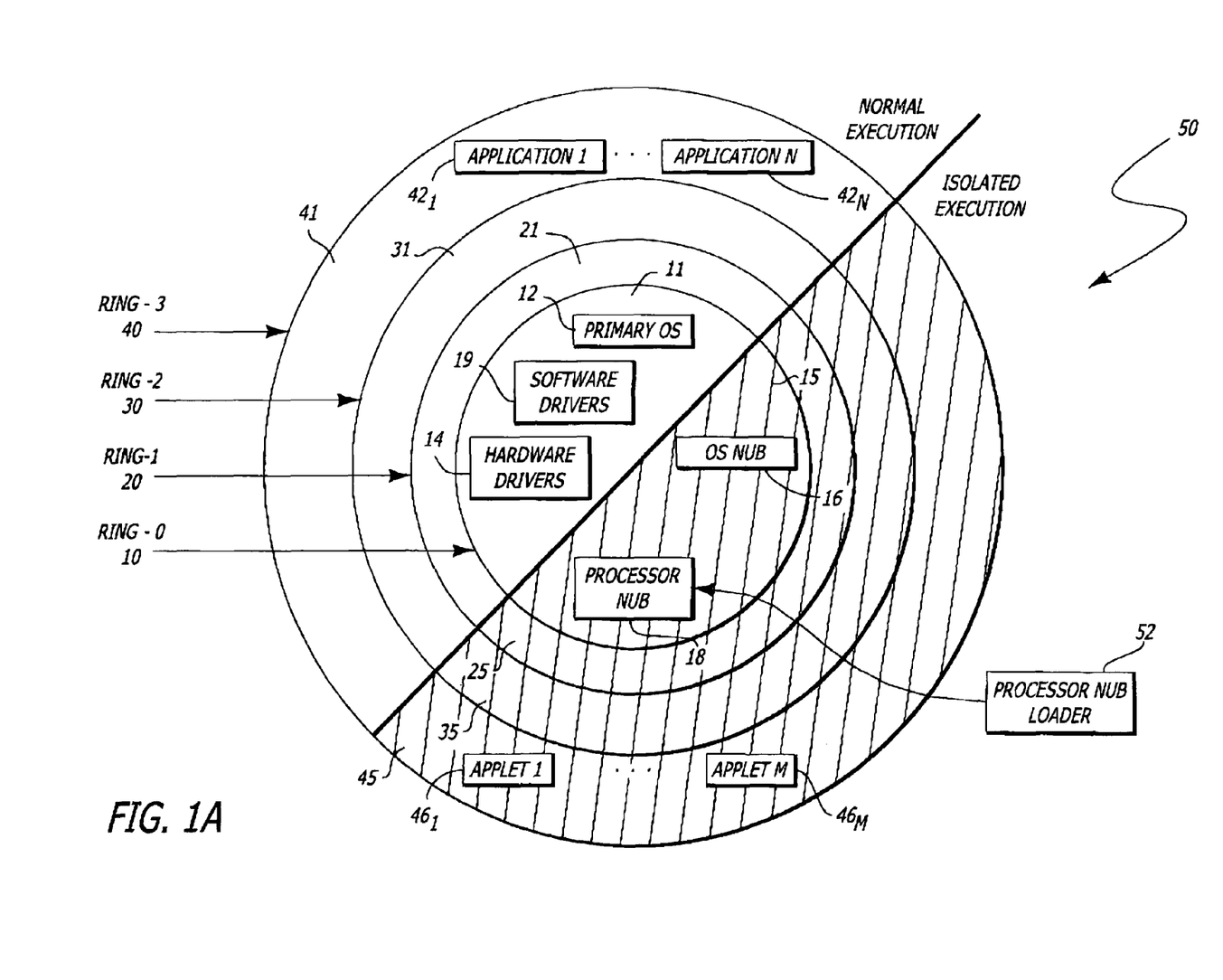
FIG. 1A is a diagram illustrating an embodiment of the logical operating architecture for the ISOX™ architecture of the platform.

FIG. 1A is a diagram illustrating an embodiment of a logical operating architecture 50 of the ISOX™ architecture. The logical operating architecture 50 is an abstraction of the components of an operating system and the processor. The logical operating architecture 50 includes ring-0 10, ring-1 20, ring-2 30, ring-3 40, and a processor nub loader 52. The logical operating architecture 50 has at least two modes of operation: normal execution mode and isolated execution mode. Each ring in the logical operating architecture 50 can operate in both modes. The processor nub loader 52 operates only in the isolated execution mode.

Ring-0 10 includes two portions: a normal execution Ring-0 11 and an isolated execution Ring-0 15. The normal execution Ring-0 11 includes software modules that are critical for the operating system. Typically, these software modules include a primary operating system 12 referred to as the "kernel"(e.g., the unprotected segments of the operating system), software drivers 13, and hardware drivers 14. The isolated execution Ring-0 15 includes an operating system (OS) nub 16 and a processor nub 18 as described below. The OS nub 16 and the processor nub 18 are instances of an OS executive (OSE) and processor executive (PE), respectively. The OSE and the PE are part of executive entities that operate in a secure environment associated with the isolated area 70 and the isolated execution mode. The processor nub loader 52 is a protected bootstrap loader code held within the chipset itself and is responsible for loading the processor nub 18 from the processor or chipset into a region of protected memory as further described below.

Similarly, ring-1 20, ring-2 30, and ring-3 40 include normal execution ring-1 21, ring-2 31, ring-3 41, and isolated execution ring-1 25, ring-2 35, and ring-3 45, respectively. In particular, normal execution ring-3 includes N applications $42_1$–$42_N$ and isolated execution ring-3 includes M applets $46_1$–$46_M$(where "N" and "M" are positive whole numbers).

One concept of the isolated execution architecture is the creation of a region in system memory protected by the processor and/or chipset in the platform. This region of protected memory is referred to as an "isolated area". Access to the isolated area is permitted using special memory read and write cycles, which are referred to as "isolated read and write" cycles. The isolated read and write cycles are issued by the processor operating in the isolated execution mode.

The processor nub loader 52 verifies and loads a ring-0 nub software module (e.g., processor nub 18) into the isolated area. The processor nub 18 provides the basic hardware-related services to support isolated execution. For example, one task of the processor nub 18 is to verify and load the ring-0 OS nub 16 into the isolated area 70 as shown in FIG. 1B.

The OS nub 16 provides links to services in the primary operating system 12, provides page management within the isolated area, and has the responsibility for loading some ring-0 software modules as well as ring-3 software modules 45 (e.g., applets $46_1$–$46_M$) into protected pages allocated in the isolated area. The OS nub 16 may also support encrypting and hashing the isolated area pages before evicting the page(s) to the ordinary (unprotected) memory, and/or checking the page contents upon restoration of the page.

Figure 1B:
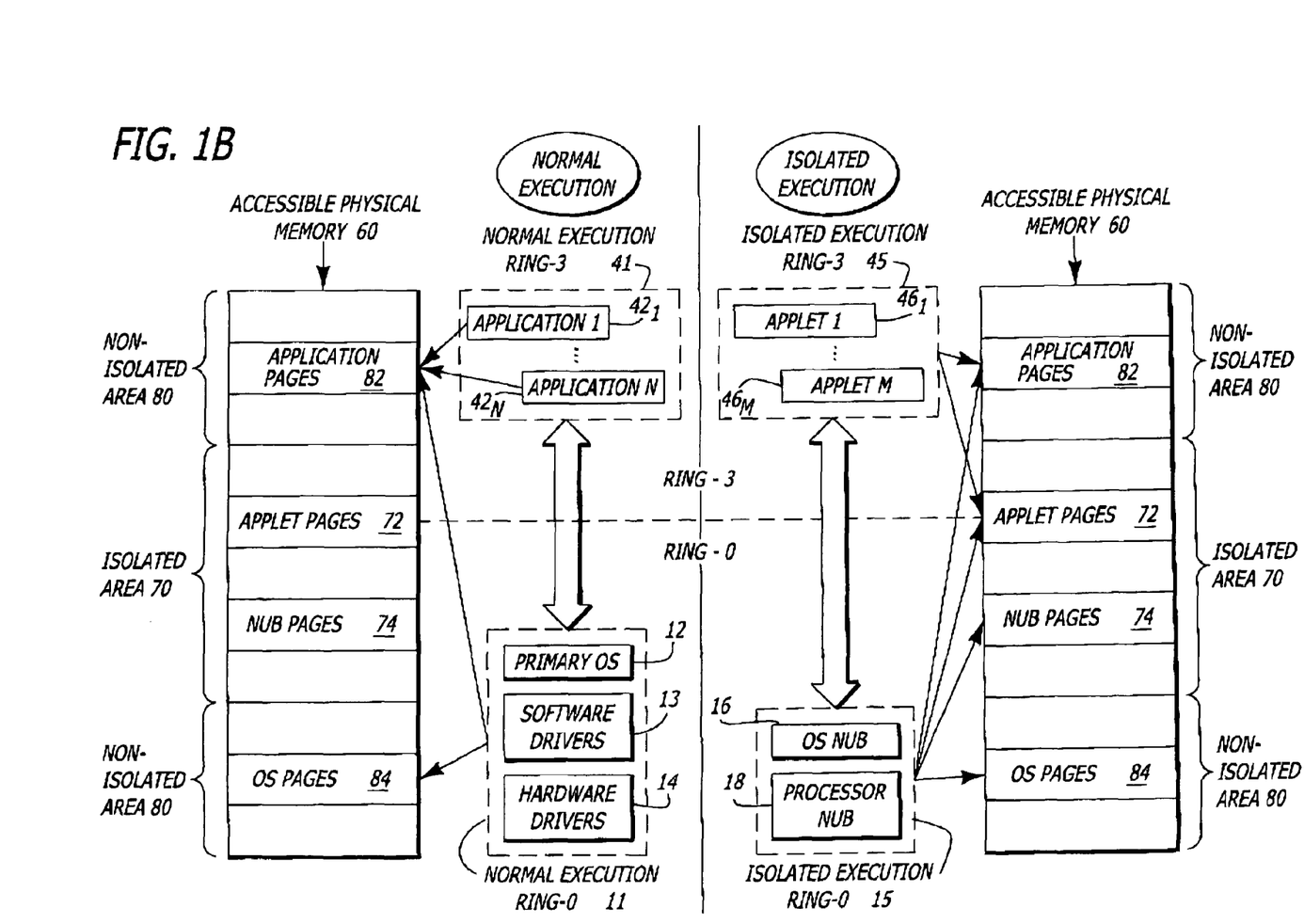
FIG. 1B is an illustrative diagram showing the accessibility of various elements in the operating system and the processor according to one embodiment of the invention.

FIG. 1B is an illustrative diagram showing the accessibility of various elements in the operating system 10 and the processor according to one embodiment of the invention. For clarity sake, only elements of ring-0 10 and ring-3 40 are shown. The various elements in the logical operating architecture 50 access an accessible physical memory 60 according to their ring hierarchy and the execution mode.

The accessible physical memory 60 includes an isolated area 70 and a non-isolated area 80. The isolated area 70 includes applet pages 72 and nub pages 74. The non-isolated area 80 includes application pages 82 and operating system (OS) pages 84. The isolated area 70 is accessible only to elements of the operating system and processor operating in isolated execution mode. The non-isolated area 80 is accessible to all elements of the ring-0 operating system and processor.

The normal execution ring-0 11 including the primary OS 12, the software drivers 13, and the hardware drivers 14, can access both the OS pages 84 and the application pages 82. The normal execution ring-3, including applications $42_1$–$42_N$, can access only to the application pages 82. Both the normal execution ring-0 11 and ring-3 41, however, cannot access the isolated area 70.

The isolated execution ring-0 15, including the OS nub 16 and the processor nub 18, can access both the isolated area 70 (including the applet pages 72 and the nub pages 74) and the non-isolated area 80 (including the application pages 82 and the OS pages 84). The isolated execution ring-3 45, including applets $46_1$–$46_M$, can access only the application pages 82 and the applet pages 72. The applets $46_1$–$46_M$ reside in the isolated area 70.

Figure 1C:
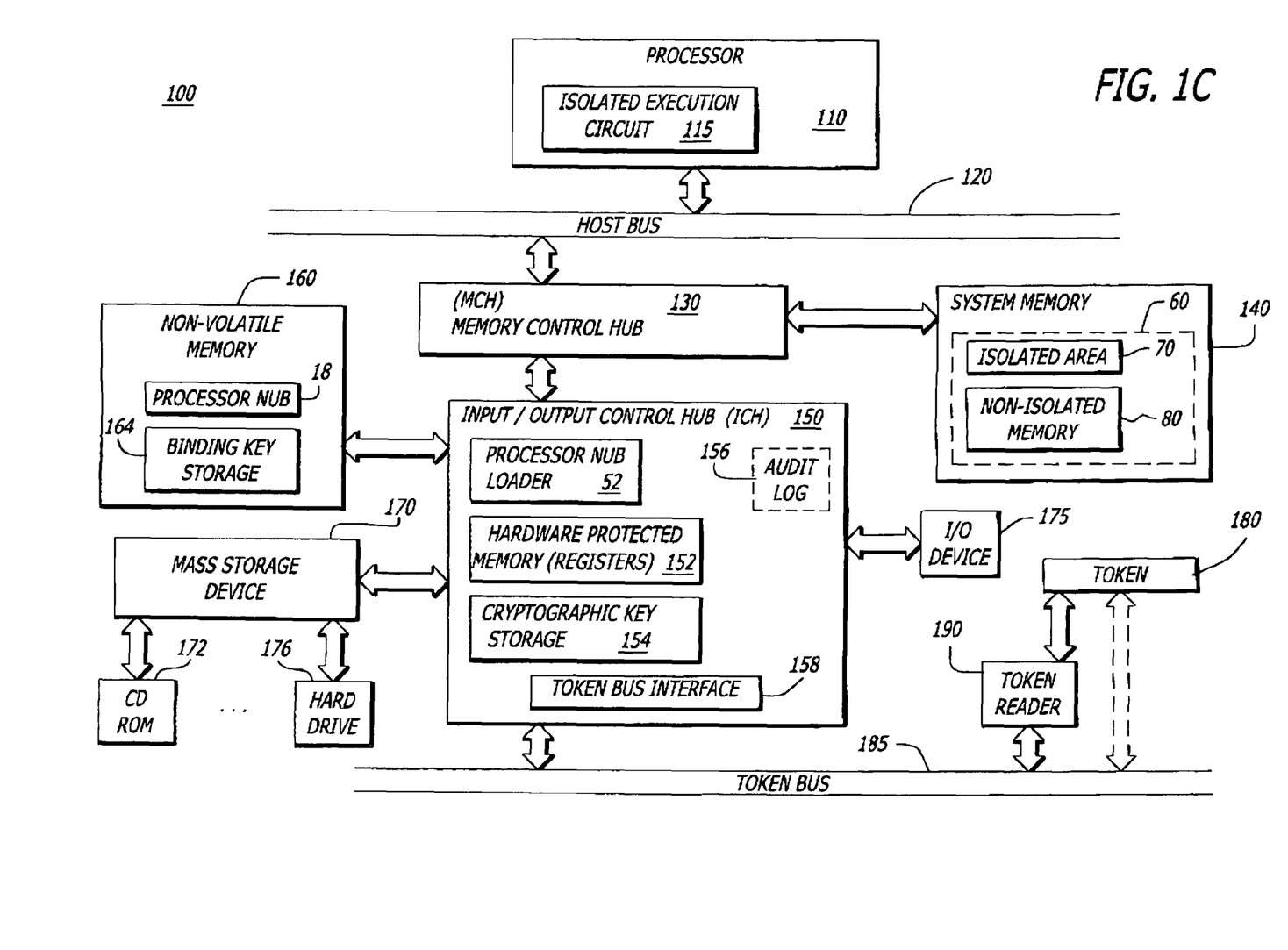
FIG. 1C is a block diagram of an illustrative embodiment of a platform utilizing the present invention.

Referring to FIG. 1C, a first block diagram of an illustrative embodiment of a platform utilizing the present invention is shown. The platform 100 comprises a processor 110, a system memory 140 and an input/output control hub (ICH) 150 in communication with each other. In this embodiment, however, the platform 100 further includes a memory control hub (MCH) 130 and a non-volatile memory (e.g., flash) 160 coupled to the ICH 150. The MCH 130 is further coupled to the processor 110 via a host bus 120. The ICH 150 may be integrated into a chipset together with or separate from the MCH 130.

It is contemplated that the platform 100 may be in communication with peripheral components such as a mass storage device 170, one or more input/output (I/O) devices 175, and a token 180 via a token bus 185 and/or a token reader 190. For clarity, the specific links for these peripheral components (e.g., Peripheral Component Interconnect "PCI", accelerated graphics port "AGP", Industry Standard Architecture "ISA", Universal Serial Bus "USB", etc.) are not shown.

The processor 110 represents a central processing unit of any type of architecture, such as complex instruction set computers (CISC), reduced instruction set computers (RISC), very long instruction word (VLIW), or hybrid architecture. In one embodiment, the processor 110 is compatible with the Intel Architecture (IA) processor, such as the IA-32 and the IA-64. The processor 110 includes an isolated execution circuit 115. The isolated execution circuit 115 provides a mechanism to allow the processor 110 to operate in an isolated execution mode. The isolated execution circuit 115 provides hardware and software support for the isolated execution mode. This support includes configuration for isolated execution, definition of the isolated area, definition (e.g., decoding and execution) of isolated instructions, generation of isolated access bus cycles, and generation of isolated mode interrupts.

The host bus 120 provides interface signals to allow the processor 110 to communicate with other processors or devices, e.g., the MCH 130. In addition to normal mode, the host bus 120 supports an isolated access bus mode with corresponding interface signals for isolated read and write cycles when the processor 110 is configured in the isolated execution mode. The isolated access bus mode is asserted on memory accesses initiated while the processor 110 is in the isolated execution mode if the physical address falls within the isolated area address range. The isolated access bus mode is also asserted on instruction pre-fetch and cache write-back cycles if the address is within the isolated area address range. The processor 110 responds to snoop cycles to a cached address within the isolated area address range if the isolated access bus cycle is asserted.

The MCH 130 provides control and configuration of memory and input/output devices such as the system memory 140 and the ICH 150. The MCH 130 provides interface circuits to recognize and service isolated access assertions on memory reference bus cycles, including isolated memory read and write cycles. In addition, the MCH 130 has memory range registers (e.g., base and length registers) to represent the isolated area in the system memory 140. Once configured, the MCH 130 aborts any access to the isolated area when the isolated access bus mode is not asserted.

The system memory 140 stores code and data. The system memory 140 is typically implemented with dynamic random access memory (DRAM) or static random access memory (SRAM). The system memory 140 includes the accessible physical memory 60 (shown in FIG. 1B). The accessible physical memory includes a loaded operating system (OS) 142, the isolated area 70 (shown in FIG. 1B), and an isolated control and status space 148. The loaded OS 142 is the portion of the operating system that is loaded into the system memory 140. The loaded OS 142 is typically loaded from mass storage device 170 via some boot code in a boot storage such as a boot read only memory (ROM).

As shown in FIGS. 1B and 1C, the isolated area 70 is the memory area that is defined by the processor 110 when operating in the isolated execution mode. Access to the isolated area 70 is restricted and is enforced by the processor 110 and/or the MCH 130 or other chipset that integrates the isolated area functionalities.

Referring back to FIG. 1C, the isolated control and status space 148 is an input/output (I/O)-like, independent address space defined by the processor 110 and/or the MCH 130. The isolated control and status space 148 contains (i) isolated execution control and status registers, and (ii) related initialization code invoked directly by the isolated instructions executed by the processor 110. The isolated control and status space 148 does not overlap any existing address space and is accessed using the isolated bus cycles. The system memory 140 may also include other programs or data that are not shown herein.

As shown in FIG. 1C, the ICH 150 has a number of functionalities that are designed to support isolated execution in addition to the traditional I/O functions. In this embodiment, the ICH 150 comprises at least the processor nub loader 52 (shown in FIG. 1A), a hardware-protected memory 152, a cryptographic key storage 154 and a token bus interface 158 to provide a signaling interface with the token bus 185. For clarity, only one ICH 150 is shown although platform 100 may be implemented with multiple ICHs. When there are multiple ICHs, a designated ICH is selected to control the isolated area configuration and status. This selection may be performed by an external strapping pin. As is known by one skilled in the art, other methods of selecting can be used.

The processor nub loader 52, as shown in FIGS. 1A and 1C, includes a processor nub loader code and its hash value (or digest). After being invoked by execution of an appropriate isolated instruction (e.g., ISO-INIT) by the processor 110, the processor nub loader 52 is transferred to the isolated area 70. Thereafter, the processor nub loader 52 copies the processor nub 18 from the non-volatile memory 160 into the isolated area 70, verifies and places the hash value of the processor nub 18 into an audit log of the hardware-protected memory 152 as described below. In one embodiment, the hardware-protected memory 152 is implemented as any memory array with single write, multiple read capability. This non-modifiable capability is controlled by logic or is part of the inherent nature of the memory itself. For example, as shown, the protected memory 152 may include a plurality of single write, multiple read registers.

As shown in FIGS. 1C, in one embodiment, the protected memory 152 includes an audit log 156. The "audit log" 156 is a listing of data that represents what information has been successfully loaded into the system memory 140 after power-on of the platform 100. For example, the representative data may be hash values of software modules loaded into the system memory 140. These software modules may include the processor nub 18, the OS nub 16, and/or any other critical software modules (e.g., ring-0 modules) loaded into the isolated area 70. Thus, the audit log 156 can act as a fingerprint that identifies information loaded into the platform (e.g., the ring-0 code controlling the isolated execution configuration and operation), and is used to attest or prove the state of the current isolated execution.

Of course, it is contemplated that the audit log 156 may be stored collectively in the protected memory 152 and unprotected memory (e.g., a memory array in the non-isolated area 80 of the system memory 140 of FIG. 1B). For that case, a pointer to the beginning of a memory array in the unprotected memory is stored in the protected memory 152. In addition, the length of the audit log 156 and a total hash value of the contents of the audit log 156 are stored with the pointer as well.

The protected memory 152 further contains a predetermined address space reserved so that any read or write to the predetermined address space is passed to the token 180. For example, one portion of address space may include a register containing an address of an attestation key.

The cryptographic key storage 154 holds a symmetric key that is unique for the platform 100. In one embodiment, the cryptographic key storage 154 includes internal fuses that are programmed at manufacturing. Alternatively, the symmetric key contained in the cryptographic key storage 154 may be created with the aid of a random number generator.

Referring still to FIG. 1C, the non-volatile memory 160 stores non-volatile information. Typically, the non-volatile memory 160 is implemented in flash memory. The non-volatile memory 160 includes the processor nub 18 and a binding key storage 164. The processor nub 18 provides the initial set-up and low-level management of the isolated area 70 of the system memory 140, including verification, loading, and logging of the OS nub 16, and the management of the symmetric key used to protect the operating system nub's secrets. The processor nub 18 may also provide application programming interface (API) abstractions to low-level security services provided by other hardware. The processor nub 18 may also be distributed by the original equipment manufacturer (OEM) or operating system vendor (OSV) via a boot disk.

The mass storage device 170 stores archive information such as code (e.g., processor nub 18), programs, files, data, applications (e.g., applications $42_1$–$42_N$), applets (e.g., applets $46_1$–$46_M$) and operating systems. The mass storage device 170 may also include platform readable medium such as a compact disk (CD) ROM 172 or a hard drive 176 as shown. Other types of "platform readable medium" include magnetic, optical or electrical medium such as a flash memory, an erasable ROM (EROM), a floppy diskette, an optical disk, and the like.

I/O devices 175 may include any I/O devices to perform I/O functions. Examples of I/O devices 175 include controller for input devices (e.g., keyboard, mouse, trackball, pointing device), media card (e.g., audio, video, graphics), communication card (e.g., network, modem, etc.) to establish a link with a remotely located platform, or any other peripheral controllers.

The token bus 185 provides an interface between the ICH 150 and one or more tokens 180 in the system. A "token" 180 is a device that performs dedicated I/O functions with security. The token 180 may be stationary (e.g., a motherboard token) or portable to be coupled via the token reader 190 as shown. The token bus interface 158 in the ICH 150 couples the token bus 180 to the ICH 150 and ensures that when commanded to prove the state of the isolated execution, the corresponding token 180 signs only valid isolated hash values.

B. Self-Generation and Communications

Figure 2:
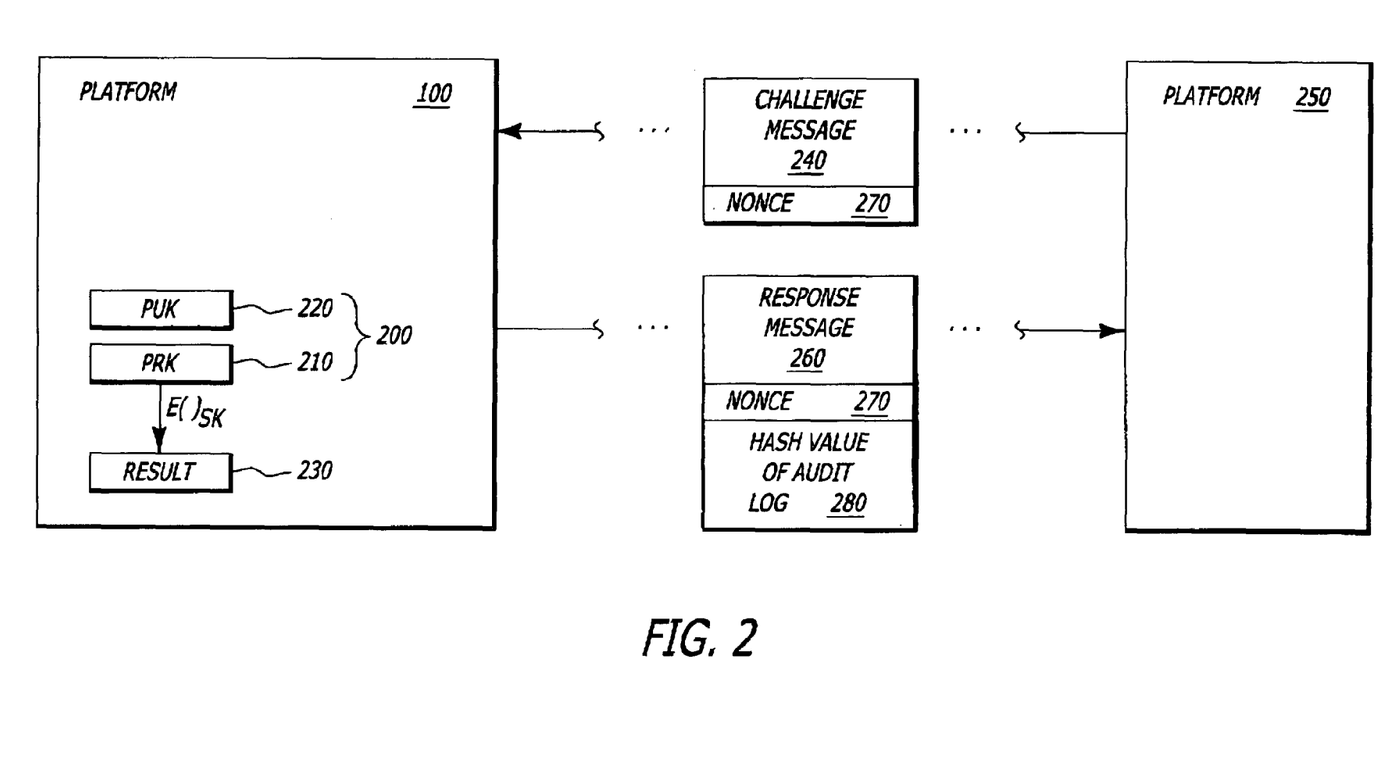
FIG. 2 is a block diagram of an illustrative embodiment of the communications between the platform of FIG. 1C and a remotely located platform.

Referring to FIG. 2, in one embodiment, an attestation key pair 200 is generated within the platform 100. A private attestation key (PRK) 210 of the attestation key pair 200 is stored in non-volatile memory protected by hardware. This non-volatile memory 215 may be part of the system memory 140 of FIG. 1 or memory employed within the chipset such as the ICH 150 for example. It is contemplated, however, that a public attestation key 220 of the attestation key pair 200 is placed in non-volatile memory freely accessible by the software executed by the processor 110 or tokens 180 coupled to the token bus 185.

Upon receiving a challenge message 240 from a remotely located platform 250, the platform 100 generates a response message 260. Accompanied by a copy of the audit log 156, the response message 260 includes a random nonce 270 recovered from the challenge message 240 and a hash value 280 of the audit log. Since the hash value 280 may be modified during transit, software running in the isolated area 70 (see FIG. 1C) signs the random nonce 270 and hash value 280 with the private attestation key 210. Although not shown, the response message 260 may further include the audit log 156 and a certificate 290 including the public attestation key 220 and attesting that the private attestation key 210 was installed in hardware-protected memory. The audit log 156 and the certificate 290 would not need to be written into the signed portion of the message 260.

II. Certification Techniques for the Self-Generated Attestation Key

A. User Certification

Figure 3:
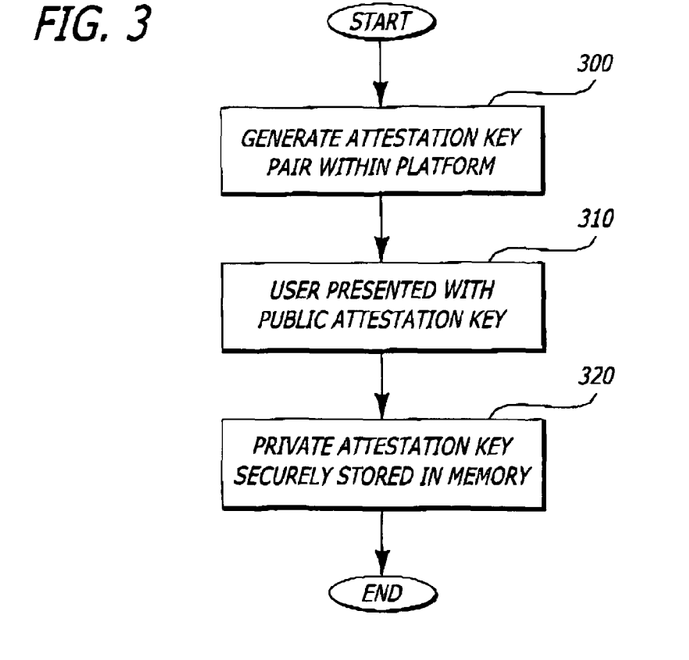
FIG. 3 is a block diagram of a first illustrative embodiment of the certification technique for the attestation key.

Referring now to FIG. 3, an illustrative flowchart of a first embodiment of the operations of the platform to certify a self-generated private attestation key loaded in protected memory is shown. During its first initial boot cycle that is normally trustable, the platform generates the attestation key pair, namely the public attestation key and its corresponding private attestation key (block 300). Herein, the attestation key pair may be generated by (i) a random or pseudo-random number generator possibly situated in the ICH, (ii) a token separate from the platform and coupled to the token bus and the like.

The user is presented with the public attestation key while the private attestation key is securely stored in memory, in one situation, by the private attestation key being stored in non-volatile memory within the platform (e.g., ICH). (blocks 310 and 320). Other situations include encrypting the private attestation key with a previously stored symmetric key. Examples for presentation of the public attestation key includes visually displaying the bits or characters forming the public attestation key or downloading the public attestation key to a platform readable medium for distribution to an entity having control of the remotely located platform for example. Thus, in certain relationships between the user and the entity (e.g., where the entity is configured to protect the user's data), the generation of the attestation key pair and providing of the public attestation key to the entity constitutes sufficient certification. That is, if the user is a reliable authority based on the perception of a certificate verifier (e.g., the entity), then the user can simply generate an attestation certificate. In this embodiment, the attestation certificate is information digitally signed by the private attestation key. Alternatively, the user can provide evidence to another entity to issue the attestation certificate.

B. Certification by an Agent for an Outside Entity

Figure 4:
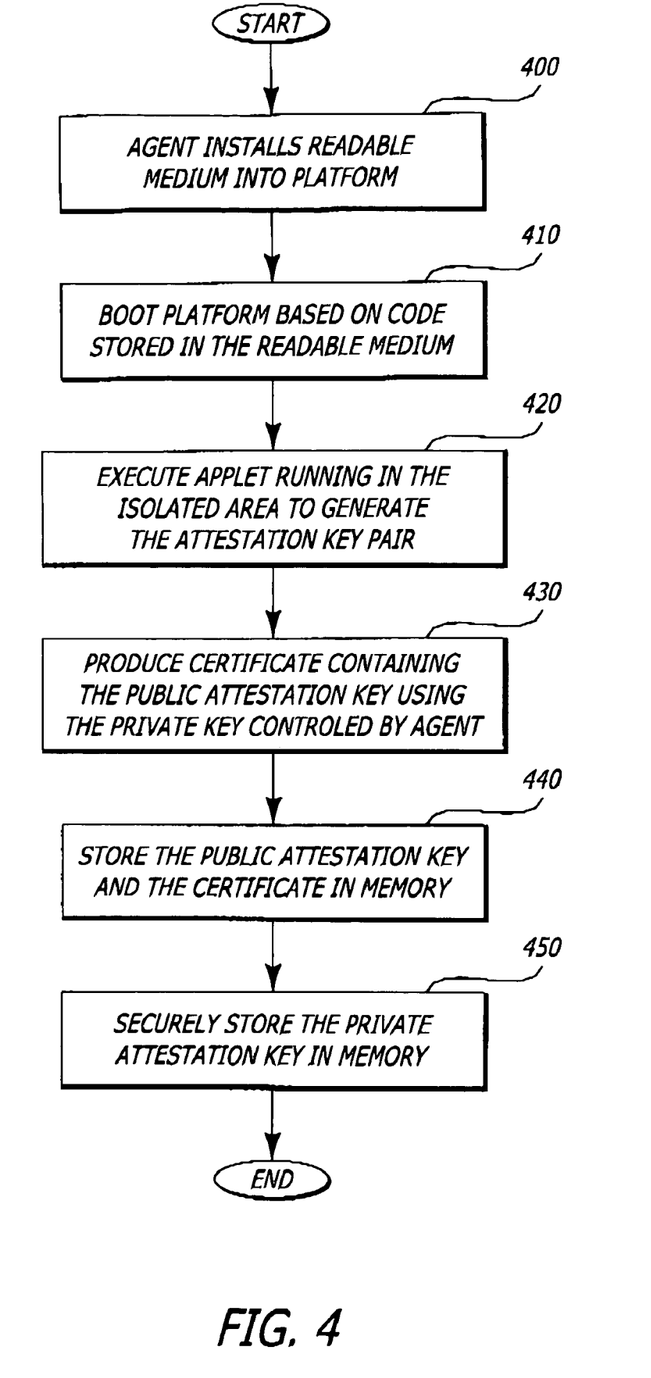
FIG. 4 is a block diagram of a second illustrative embodiment of the certification technique for the attestation key.

Referring now to FIG. 4, an illustrative flowchart of a second embodiment of the operations of the platform to certify a self-generated attestation key is shown. For example, upon installation, upgrade or repair of the platform, an agent for an entity controlling a remotely located platform installs a platform readable medium (e.g., a token, CD-ROM, etc.) and boots the platform with code approved by the entity stored on the readable medium (blocks 400 and 410). The agent may now execute an applet running within the isolated area of the system memory to generate the attestation key pair (block 420).

In particular, a public attestation key of the attestation key pair is provided to an application supplied by the readable medium in order to produce an attestation certificate. The certificate generally includes the public attestation key encrypted with a private key of the entity represented by the agent (blocks 430 and 440). The public key and the certificate are placed in the protected memory for subsequent transmission to a remote platform when verifying the security of the platform (block 450). That is, when the user is not an acceptable authority on the state of the platform to some verifier, some agent for that verifier can inspect the platform and issue the attestation certificate.

C. Original Equipment Manufacturer

Figure 5:
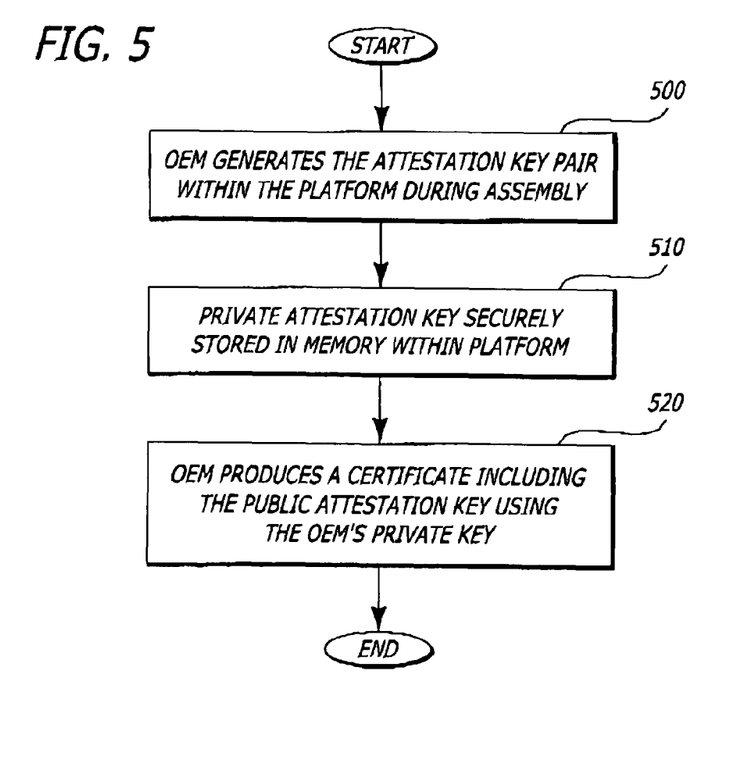
FIG. 5 is a block diagram of a third illustrative embodiment of the certification technique for the attestation key.

Referring to FIG. 5, an illustrative flowchart of a third embodiment of the operations of the platform to certify a self-generated attestation key is shown. As set forth in block 500, the public attestation key is generated during assembly of the platform by the original equipment manufacturer (OEM). The OEM signs the certificate including the public attestation key to certify that its corresponding private key is securely stored in protected memory (e.g., either cryptographically secure or stored in hardware protected memory such as memory 152 of FIG. 1C or in the isolated area 70) and that the protected memory has not been tampered with (blocks 510 and 520). This case is similar as described above, in that some agent other than the user is responsible for issuing the attestation certificate, but this case will have different cost and risk parameters.

In all three cases or any others like these, the choice of issuer of an attestation certificate depends on criteria of any entity that will verify the certificate. That choice is based on the verifier's own preexisting relationships with the various possible attesters: the platform owner, an agent who goes to the platform in question, the OEM who built the platform, etc. A single platform might have to satisfy multiple different verifiers and might therefore hold multiple attestation certificates, over one or more attestation keys.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   generating an attestation key pair in a platform that supports isolated execution mode, wherein the platform comprises a processor capable of operating in isolated execution mode and a system memory to include an isolated area that is accessible only when the processor is operating in isolated execution mode, and wherein the attestation key pair includes a private attestation key and a public attestation key; and
   producing a certificate for the platform to attest that the platform uses isolated execution mode to protect the private key.

2. The method of claim 1, wherein the producing of the certificate occurs at an initial power-on of the platform.

3. The method of claim 1, wherein the operation of generating an attestation key pair comprises:
   loading, into the platform, boot code provided by an agent of an outside entity;
   booting the platform from the boot code provided by the agent; and
   after booting the platform from the boot code provided by the agent, executing an applet in isolated execution mode to generate the attestation key pair.

4. The method of claim 3, wherein the producing of the certificate further comprises signing the certificate with a private key of the outside entity.

5. The method of claim 1, wherein the producing of the certificate comprises:
   signing the certificate with a private key held by a manufacturer of the platform.

6. The method of claim 1 further comprising:
   receiving a challenge message from a remotely located platform, the challenge message including a nonce.

7. The method of claim 6 further comprising:
   generating a response message for transmission to the remotely located platform, the response message including the certificate, the nonce and a hash value of an audit log.

8. The method of claim 7, wherein the nonce and the hash value are signed with the private attestation key.

9. A platform comprising:
   a processor to operate selectively in distinct modes including a normal execution mode and an isolated execution mode;
   storage in communication with the processor, the storage comprising a system memory to include an isolated area that is accessible only when the processor is operating in isolated execution mode;
   key generation instructions encoded in the storage, the key generation instructions to generate an attestation key pair for the platform while executing in isolated execution mode, wherein the attestation key pair comprises a private attestation key and a public attestation key; and
   a certificate in the storage, wherein the certificate attests that the platform uses isolated execution mode to protect the private key.

10. The platform of claim 9, wherein the storage comprises a processor nub to execute in isolated execution mode and an operating system nub to execute in isolated execution mode.

11. The platform of claim 9 further comprising at least one input/output device allowing communications with a remotely located platform.

12. The platform of claim 9 further comprising:
    a device in communication with the processor; and
    a token link coupled to the device, the token link providing a communication path for a token.

13. The platform of claim 12 wherein the token stores the private attestation key of the attestation key pair.

14. The platform of claim 12, wherein the device comprises a protected memory to hold an audit log of software modules loaded on the platform in isolated execution mode.

15. The platform of claim 12, wherein the device is an input/output control hub.

16. A method comprising:
    generating an attestation key pair for a platform;
    storing a private attestation key of the attestation key pair into isolated memory of the platform, the isolated memory being accessible to a processor of the platform only when the processor operates in isolated execution mode, wherein the isolated memory comprises hardware-protected memory; and
    producing a certificate including the public attestation key, the certificate to attest that the platform stores the private attestation key in the isolated memory.

17. The method of claim 16, wherein the hardware-protected memory includes single-write, multiple-read control registers.

18. The method of claim 16, wherein the producing of the certificate occurs at an initial power-on of the platform.

19. The method of claim 16, wherein the operation of generating an attestation key pair comprises:
    booting the platform from code provided by an agent of an outside entity; and
    using the code provided by the agent to generate the attestation key pair.

* * * * *